(12) United States Patent
Lamb, Jr.

(10) Patent No.: US 9,656,760 B2
(45) Date of Patent: May 23, 2017

(54) VARIABLE GEOMETRY HELICOPTER ENGINE INLET

(71) Applicant: Sikorsky Aircraft Corporation, Stratford, CT (US)

(72) Inventor: Donald William Lamb, Jr., North Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 92 days.

(21) Appl. No.: 14/074,265

(22) Filed: Nov. 7, 2013

(65) Prior Publication Data

US 2015/0122954 A1    May 7, 2015

(51) Int. Cl.
*B64D 33/02*    (2006.01)
*F02C 7/042*    (2006.01)

(52) U.S. Cl.
CPC .............. *B64D 33/02* (2013.01); *F02C 7/042* (2013.01); *B64D 2033/0253* (2013.01); *Y10T 137/0536* (2015.04)

(58) Field of Classification Search
CPC ................................. B64D 33/02; F02C 7/042
USPC ........................................................ 244/53 B
See application file for complete search history.

(56) References Cited

U.S. PATENT DOCUMENTS

| | | | | |
|---|---|---|---|---|
| 3,265,331 A | * | 8/1966 | Miles ...................... | F02C 7/042 244/53 B |
| 3,338,049 A | | 8/1967 | Marshall | |
| 3,449,891 A | * | 6/1969 | Amelio et al. .................. | 55/306 |
| 3,575,259 A | * | 4/1971 | Wilkinson ..................... | 181/214 |
| 3,664,612 A | * | 5/1972 | Skidmore et al. ........... | 244/53 B |
| 3,991,782 A | * | 11/1976 | Schwarzler .................. | 137/15.1 |
| 4,012,013 A | * | 3/1977 | Ball .......................... | B64C 3/48 137/15.1 |
| 4,304,094 A | * | 12/1981 | Amelio ....................... | 60/39.092 |
| 4,307,743 A | * | 12/1981 | Dunn ........................... | 137/15.1 |
| 4,372,505 A | * | 2/1983 | Syberg .................. | B64D 33/02 244/53 B |
| 4,474,344 A | * | 10/1984 | Bennett ..................... | 244/53 B |

(Continued)

FOREIGN PATENT DOCUMENTS

| | | |
|---|---|---|
| EP | 0515746 | 12/1992 |
| FR | 2906569 | 4/2008 |
| JP | H07277291 A | 10/1995 |

OTHER PUBLICATIONS

European Search Report issued in EP Application No. 14191067. 9-1754; mailed Mar. 25, 2015; 6 pages.

*Primary Examiner* — Joseph W Sanderson
*Assistant Examiner* — Steven Hawk
(74) *Attorney, Agent, or Firm* — Cantor Colburn LLP

(57) ABSTRACT

A variable area engine inlet of a helicopter is provided and includes first inlet portions disposed to face one another in opposite directions and at a distance from one another and second inlet portions extending between the first inlet portions and being disposed to face one another in opposite directions and at a distance from one another. The first and second inlet portions define a capture area and at least one or both of the first and second inlet portions include a movable portion disposed to occupy and move between first and second positions. The first position is associated with a non-constricted condition of the capture area and the second position is associated with a constricted condition of the capture area.

4 Claims, 8 Drawing Sheets

(56) References Cited

U.S. PATENT DOCUMENTS

| | | | | |
|---|---|---|---|---|
| 4,502,875 A * | 3/1985 | Ballard | | 55/306 |
| 4,655,413 A * | 4/1987 | Genssler | | F02C 7/042 |
| | | | | 137/15.1 |
| 4,919,364 A * | 4/1990 | John | | B64D 27/20 |
| | | | | 244/53 B |
| 5,116,251 A * | 5/1992 | Bichler | | B64D 33/02 |
| | | | | 137/15.1 |
| 5,224,337 A * | 7/1993 | Morishita et al. | | 60/773 |
| 5,226,455 A * | 7/1993 | duPont | | B64D 33/02 |
| | | | | 137/15.1 |
| 5,697,394 A * | 12/1997 | Smith | | B64D 33/02 |
| | | | | 137/15.1 |
| 5,794,432 A * | 8/1998 | Dunbar et al. | | 60/204 |
| 5,894,722 A * | 4/1999 | Chevalier et al. | | 60/768 |
| 5,894,987 A * | 4/1999 | Layne et al. | | 165/44 |
| 5,967,169 A * | 10/1999 | Engel | | B64D 33/02 |
| | | | | 137/15.1 |
| 6,089,505 A * | 7/2000 | Gruensfelder | | B64D 33/02 |
| | | | | 137/15.1 |
| 6,349,899 B1 * | 2/2002 | Ralston | | 244/53 B |
| 6,910,327 B2 * | 6/2005 | Sakurai | | B64D 33/02 |
| | | | | 137/15.1 |
| 7,192,462 B2 * | 3/2007 | Stelzer | | B01D 46/0005 |
| | | | | 123/198 E |
| 7,491,253 B2 * | 2/2009 | Wilson | | B01D 46/002 |
| | | | | 123/198 E |
| 7,549,839 B2 | 6/2009 | Carroll et al. | | |
| 7,575,014 B2 * | 8/2009 | Stelzer | | 137/15.1 |
| 7,587,899 B2 | 9/2009 | Song et al. | | |
| 7,632,064 B2 | 12/2009 | Somanath et al. | | |
| 7,721,989 B2 | 5/2010 | Dyer et al. | | |
| 7,762,078 B2 * | 7/2010 | Lynch et al. | | 60/771 |
| 8,061,119 B2 | 11/2011 | Agrawal et al. | | |
| 8,113,461 B2 * | 2/2012 | Nannoni | | B64D 33/08 |
| | | | | 244/17.11 |
| 8,192,154 B2 | 6/2012 | Sonoda et al. | | |
| 8,210,474 B2 | 7/2012 | Dyer et al. | | |
| 8,226,359 B1 | 7/2012 | Jansen et al. | | |
| 8,439,295 B2 * | 5/2013 | Belyew | | B01D 46/10 |
| | | | | 244/53 B |
| 8,511,058 B2 | 8/2013 | Agrawal et al. | | |
| 2006/0191267 A1 | 8/2006 | Song et al. | | |
| 2007/0022723 A1 * | 2/2007 | Stelzer | | 55/502 |
| 2007/0025838 A1 * | 2/2007 | Stelzer | | 415/121.2 |
| 2008/0056904 A1 | 3/2008 | Somanath et al. | | |
| 2011/0073716 A1 * | 3/2011 | Klimpel | | 244/53 B |
| 2011/0253843 A1 * | 10/2011 | Porte | | B64D 33/08 |
| | | | | 244/53 B |
| 2012/0114463 A1 | 5/2012 | Beers et al. | | |
| 2013/0087661 A1 * | 4/2013 | Brown et al. | | 244/201 |

* cited by examiner

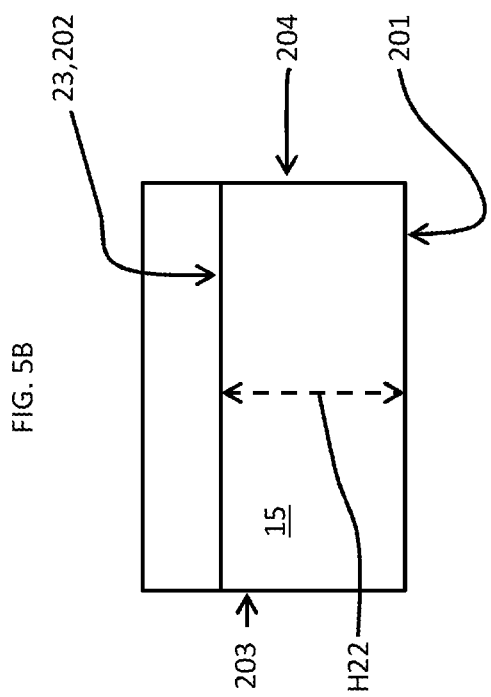
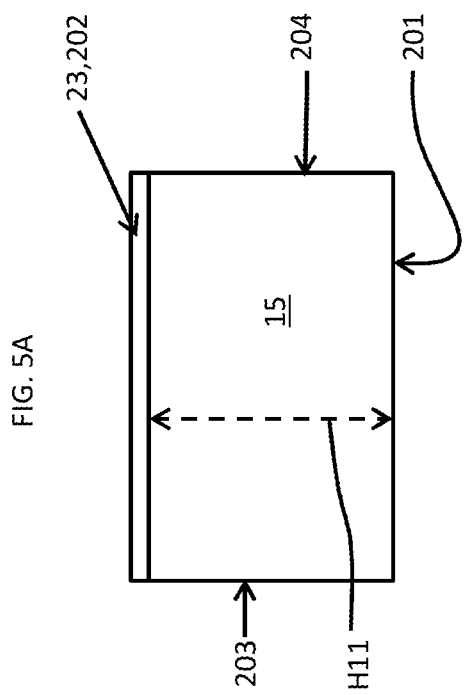

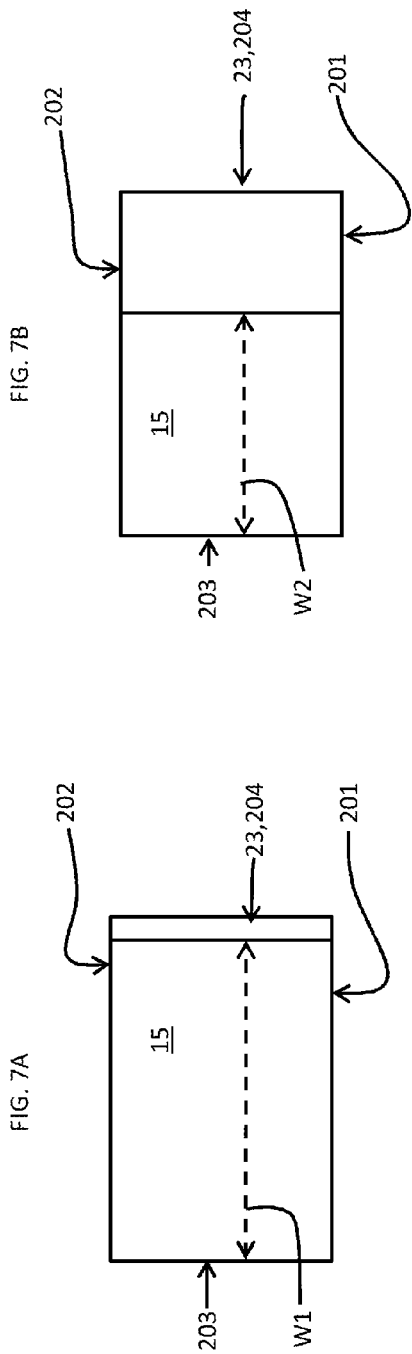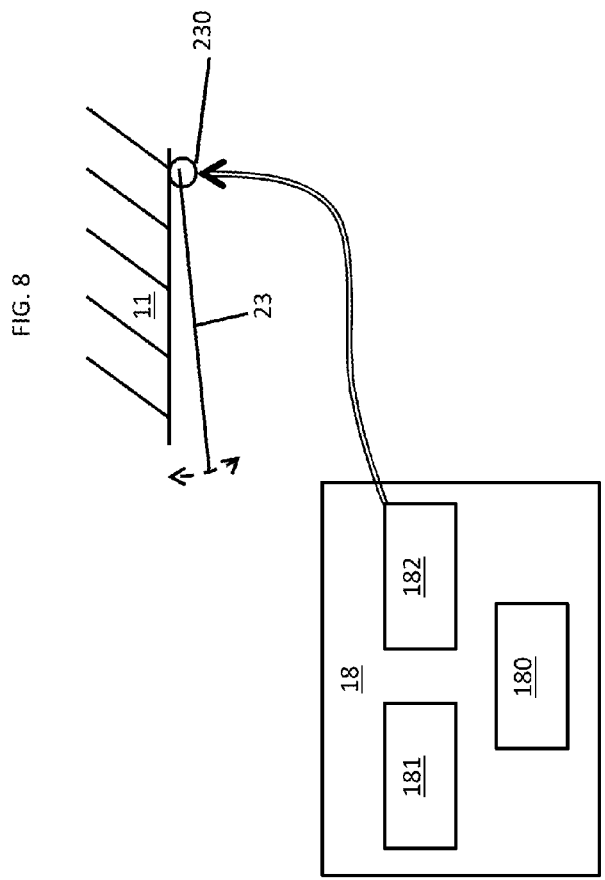

VARIABLE GEOMETRY HELICOPTER ENGINE INLET

BACKGROUND OF THE INVENTION

The subject matter disclosed herein relates to a helicopter engine inlet and, more particularly, to a helicopter engine inlet with variable geometry.

A problem with high speed rotorcraft is the need to balance external aerodynamic performance with engine inlet performance. Larger inlet capture areas are required for higher engine performance at lower speeds and especially hover conditions to permit a greater amount of air to flow into the engine than would be possible at low speeds or hover conditions with relatively small inlets. These larger inlet capture areas, however, do not provide appreciable engine performance benefit at higher speeds and in many cases act to the detriment of the overall aerodynamic performance of the aircraft. Moreover, the larger inlet capture areas tend to be oversized in the presence of ramming air at high speeds and thus may result in inlet spillage. Such spillage, when coupled with the larger exposed surface facing into the freestream flow, may result in higher drag.

Prior solutions for sizing rotorcraft inlets have required that a fixed inlet size be chosen. The fixed inlet size necessitates a performance compromise in either engine performance at lower speeds and hover, greater aircraft drag at higher speeds or a combination of the two if a design is chosen in the middle range of inlet sizes.

Other prior solutions have given rise to variable geometry inlets but these have generally been used only for supersonic fixed wing aircraft and, most often to mitigate supersonic shock.

BRIEF DESCRIPTION OF THE INVENTION

According to one aspect of the invention, a variable area engine inlet of a helicopter is provided and includes first inlet portions disposed to face one another in opposite directions and at a distance from one another and second inlet portions extending between the first inlet portions and being disposed to face one another in opposite directions and at a distance from one another. The first and second inlet portions define a capture area and at least one or both of the first and second inlet portions include a movable portion disposed to occupy and move between first and second positions. The first position is associated with a non-constricted condition of the capture area and the second position is associated with a constricted condition of the capture area.

According to another aspect of the invention, a helicopter is provided and includes an airframe including a variable area engine inlet, at least one rotor, which is rotatable relative to the airframe to generate lift and/or thrust and an engine disposed within an interior of the airframe to be receptive of air drawn into the interior through the variable area engine inlet. The engine is coupled to the at least one rotor to drive rotation of the rotor in accordance with a combustion of a mixture of fuel and the air. A capture area of the variable area engine inlet is variable in accordance with current conditions.

According to yet another aspect of the invention, a method of controlling a variable area engine inlet of a helicopter is provided and includes determining whether a current flight condition is a hover or low-speed flight condition or a high-speed flight condition, constricting a capture area of the variable area engine inlet in an event a result of the determining indicates that the current flight condition is the high-speed flight condition and dilating the capture area in an event the result of the determining indicates that the current flight condition is the hover or low-speed flight condition.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5A is a schematic axial view of the helicopter engine inlet of FIG. 4 in a non-constricted condition;

FIG. 5B is a schematic axial view of the helicopter engine inlet of FIG. 4 in a constricted condition;

FIG. 7A is a schematic axial view of the helicopter engine inlet of FIG. 6 in a non-constricted condition;

FIG. 7B is a schematic axial view of the helicopter engine inlet of FIG. 6 in a constricted condition;

FIG. 8 is a schematic illustration of a moveable portion of the helicopter inlets of FIGS. 4 and 5A, 5B or FIGS. 6 and 7A, 7B with a hinge element in accordance with embodiments;

The detailed description explains embodiments of the invention, together with advantages and features, by way of example with reference to the drawings.

DETAILED DESCRIPTION OF THE INVENTION

As will be described below, a single- or multiple-duct variable geometry helicopter engine inlet is provided and includes a movable portion of the inlet such that a size of a capture area of the inlet can be varied. The movable portion includes an internal flow surface and an aerodynamic surface for external flow to limit drag while the internal flow surface varies the inlet capture area and diffusion or convergence ratios. The capture area of the inlet can thus be varied to suit a current flight condition. The movable portion can be provided on a top and/or a side of the inlet and may provide for an increased diffusion ratio in its constricted area position where such increased diffusion ratio may be tolerated or desired at higher speeds due to the presence of ram effects.

Figure 1:
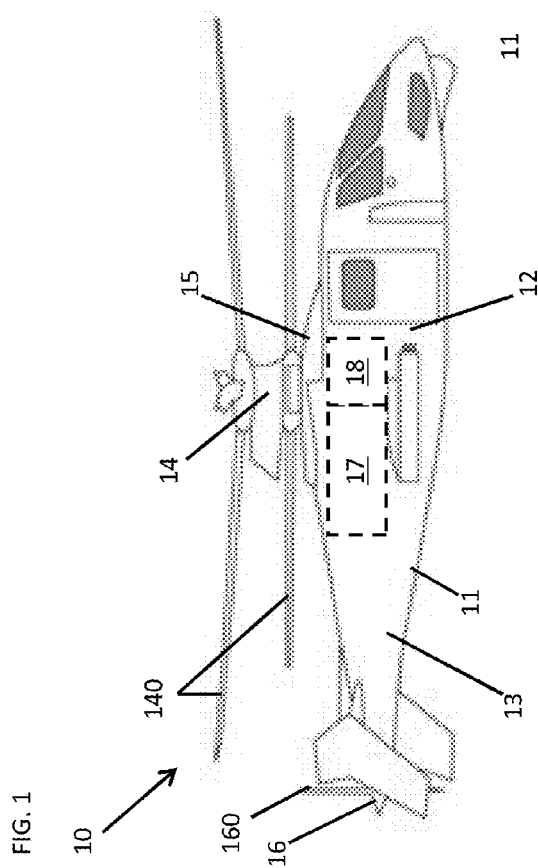
FIG. 1 is a schematic illustration of a helicopter in accordance with embodiments.
Figure 2:
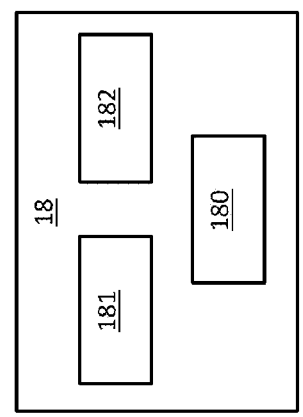
FIG. 2 is a schematic illustration of a controller of the helicopter of FIG. 1.
Figure 3:
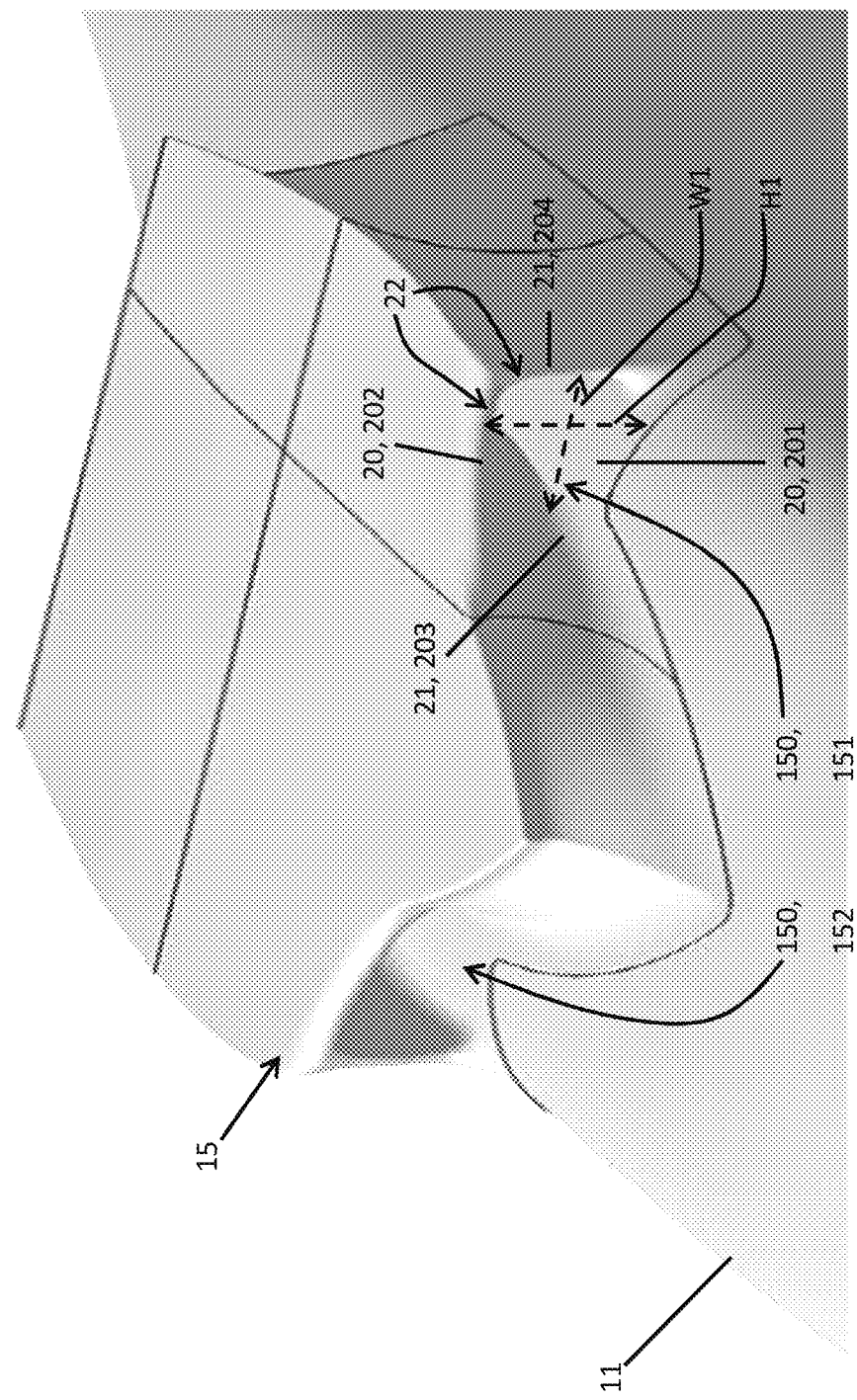
FIG. 3 is a perspective view of helicopter engine inlets in accordance with embodiments.

With reference to FIGS. 1-3, a helicopter 10 is provided and includes an airframe 11. The airframe 11 is formed to define a cabin portion 12 and a tail portion 13. At a top or uppermost section of the cabin portion 12, the airframe includes a main rotor section 14 and a variable area engine inlet 15 (or "inlets" in the case of a multiple-duct engine inlet). At the tail portion 13, the airframe includes a tail rotor section 16. The helicopter 10 further includes at least a main rotor 140 rotatably supported in the main rotor section 14 and a tail rotor 160 rotatably supported in the tail rotor section 16. Both the main rotor 140 and the tail rotor 160 are rotatable relative to the airframe 11 to generate lift forces and thrust forces.

The helicopter 10 also includes an engine 17 and a controller 18. The engine 17 is disposed within an interior of the airframe 11 and is receptive of air drawn into the interior of the airframe 11 through the variable area engine inlet 15. The engine 17 is coupled to the main rotor 140 and the tail rotor 160 and is configured to drive rotation of the main rotor 140 and the tail rotor 160 by way of gear trains in accordance with combustion of a mixture of fuel and the air drawn into the interior of the airframe 11. The controller 18 may be embodied as a flight control computer.

In accordance with embodiments, the controller 18 may include a memory unit 180, a processing unit 181 and servo elements 182, which are coupled to the variable area engine inlet 15. The memory unit 180 has executable instructions stored thereon. When executed, the executable instructions cause the processing unit 181 to determine whether a current flight condition is a hover, low-speed or high-speed flight condition or whether there is an asymmetric condition in a multi-duct inlet and to operate the servo elements 182 to vary a capture area 150 of the variable area engine inlet 15 in accordance with the determined current condition. That is, the controller 18 is configured to constrict the capture area 150 of the variable area engine inlet 15 in accordance with the current flight condition being a high-speed flight condition, to dilate the capture area 150 in accordance with the current flight condition being a low-speed or a hover flight condition and to use a combination of constricted and unconstructed areas in multi-duct inlets to equalize flow conditions.

The variable area engine inlet 15 includes a pair of first inlet portions 20 and a pair of second inlet portions 21. The first inlet portions 20 are disposed to face one another in opposite directions and at a distance from one another. The second inlet portions 21 respectively extend between the first inlet portions 20 and are disposed to face one another in opposite directions and at a distance from one another. The first inlet portions 20 may be oriented transversely or, in some cases, perpendicularly with respect to the second inlet portions 21.

In accordance with embodiments and, as shown in FIG. 3, one of the first inlet portions 20 may be provided as a section 201 of fuselage of the airframe 11 while the other of the first inlet portions 20 may be provided as a horizontally oriented top wall section 202. In these embodiments, one of the second inlet portions 21 may be provided as a section 203 of a main rotor pylon while the other of the second inlet sections 21 may be provided as a vertically oriented side wall section 204. In accordance with further embodiments, leading sides of the first and second inlet portions 20 and 21 may include aerodynamic elements 22 to limit drag on airflow flowing around the variable area engine inlet 15.

As shown in FIG. 3 (and in FIGS. 4 and 6 to be described below), a distance between the section 201 of the fuselage of the airframe 11 and the horizontally oriented top wall section 202 defines at least an initial height H1 of the variable area engine inlet 15 and a distance between the section 203 of the main rotor pylon and the vertically oriented side wall section 204 defines at least an initial width W1 of the variable area engine inlet 15. The initial height H1 and the initial width W1 may cooperatively define a non-constricted or dilated condition of the capture area 150.

With reference to FIGS. 4-7B, at least one or both of the first inlet portions 20 and/or the second inlet portions 21 may include a movable portion 23. The movable portion 23 is disposed to occupy and move between first and second positions. The first position is associated with a non-constricted condition of the capture area 150 of the variable area engine inlet 15 and the second position is associated with a constricted condition of the capture area 150.

Figure 4:
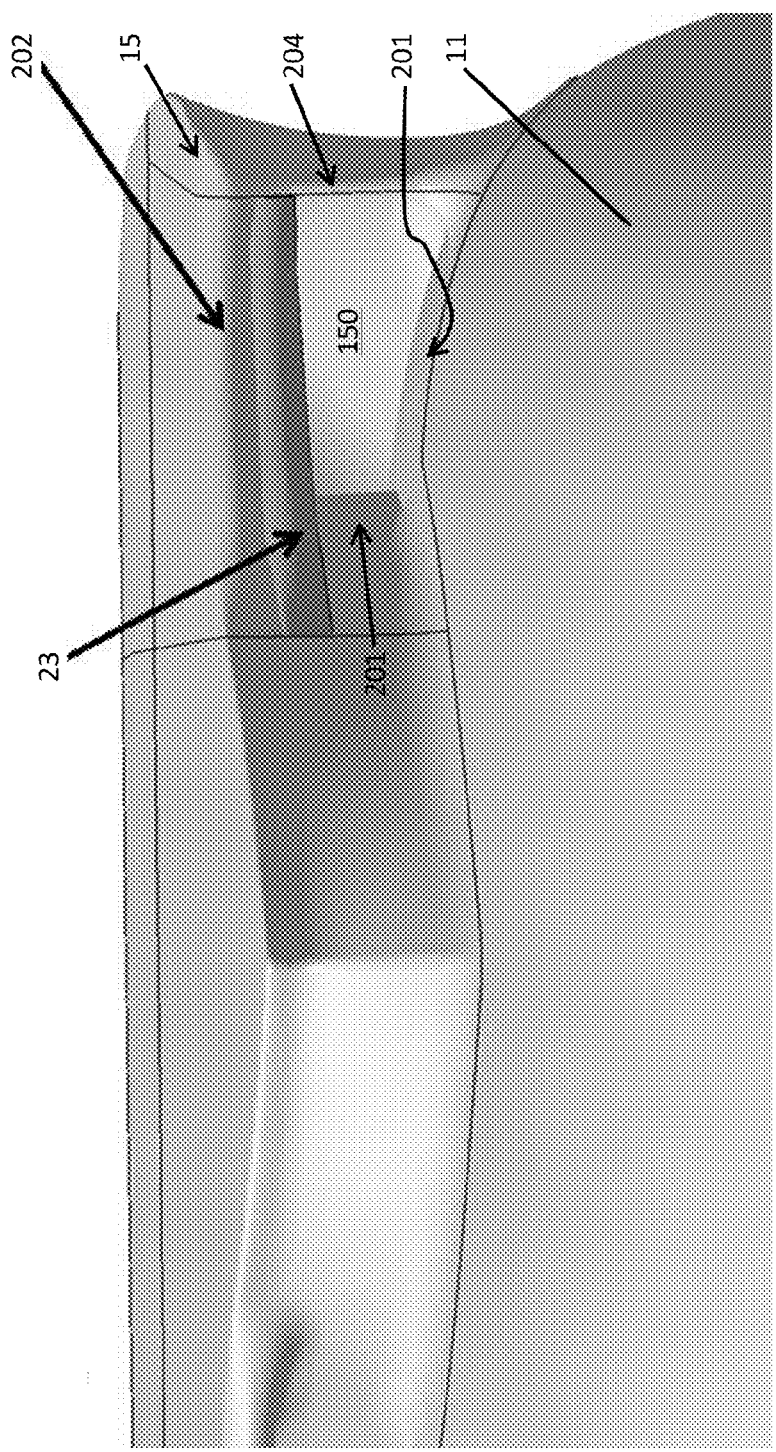
FIG. 4 is an axial view of a helicopter engine inlet with variable geometry in accordance with embodiments.

That is, as shown in FIGS. 4, 5A and 5B, the movable portion 23 may be provided as the horizontally oriented top wall section 202 or may be a component of the same. In such cases, the non-constricted condition is assumed when the current flight conditions are low-speed or hover flight conditions and the movable portion 23 is accordingly disposed such that a height of the variable area engine inlet 15 is defined as the initial height H1. By contrast, the constricted condition is assumed when the current flight conditions are high-speed flight conditions and the movable portion 23 is accordingly disposed such that the height of the variable area engine inlet 15 is defined as a secondary height H2, which is shorter than the initial height H1 due to the fact that the horizontally oriented top wall section 202 has moved downwardly.

Figure 6:
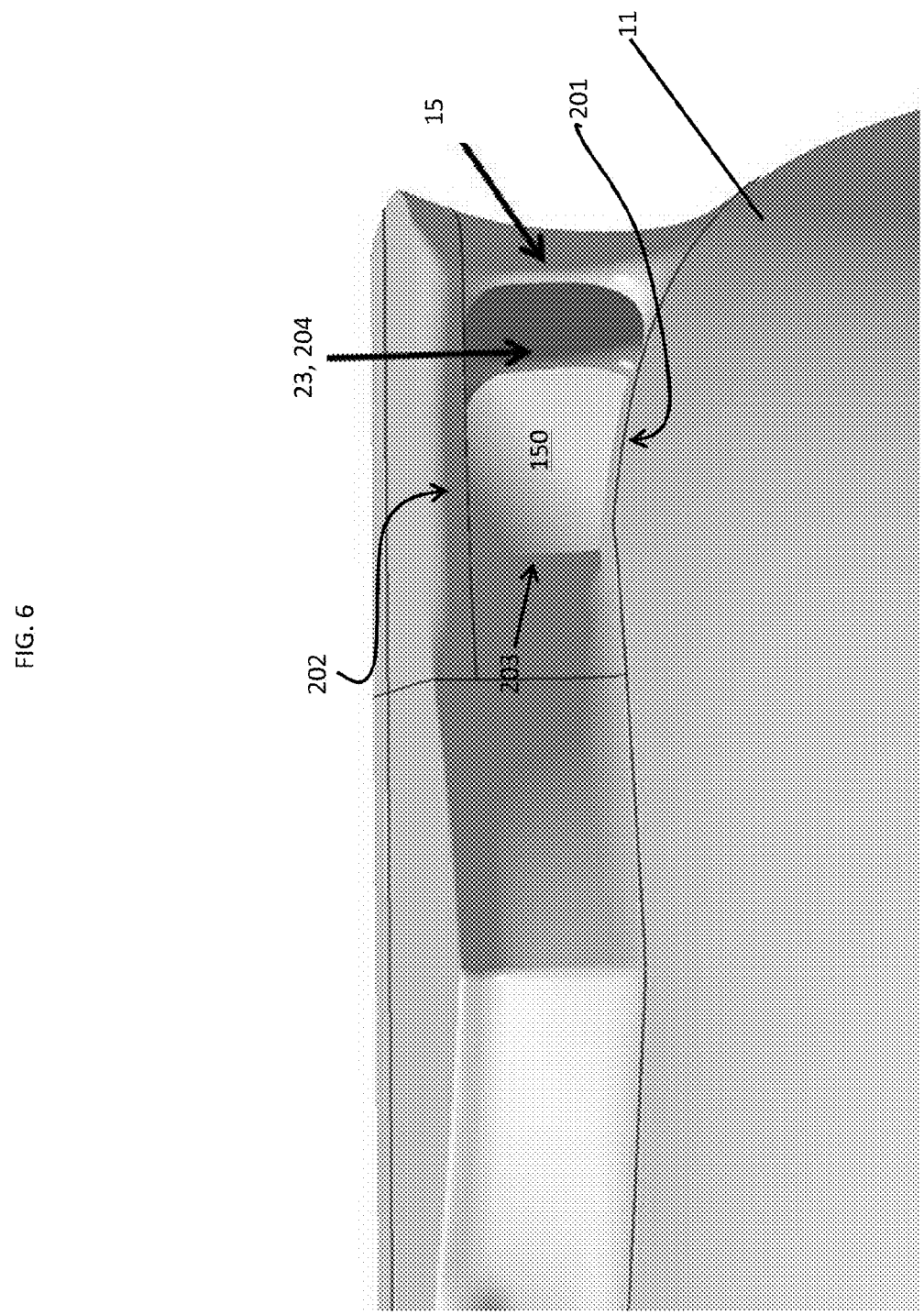
FIG. 6 is an axial view of a helicopter engine inlet with variable geometry in accordance with embodiments.

Similarly, as shown in FIGS. 6, 7A and 7B, the movable portion 23 may be provided as the vertically oriented side wall section 204 or may be a component of the same. In such cases, the non-constricted condition is assumed when the current flight conditions are low-speed or hover flight conditions and the movable portion 23 is accordingly disposed such that a width of the variable area engine inlet 15 is defined as the initial width W1. By contrast, the constricted condition is assumed when the current flight conditions are high-speed flight conditions and the movable portion 23 is accordingly disposed such that the width of the variable area engine inlet 15 is defined as a secondary width W2, which is shorter than the initial width W1 due to the fact that the vertically oriented side wall section 204 has moved laterally.

In accordance with embodiments and, with reference to FIG. 8, the airframe 11 may include a hinge 230 by which the movable portion 23 is coupled to the airframe 11. In such cases, the movable portion 23 is disposed to occupy and move between the first and second positions by being driven to pivot about the hinge 230 by the servo elements 182 of the controller 18, which in some embodiments may be provided as a solenoid motor disposed proximate to the movable portion 23. It should be understood that other embodiments exist for driving, moving or otherwise controlling the movable portion 23 to move between the first and second positions. These other embodiments may include, but are not limited to, moving the movable portion 23 in a translating motion in which the movable portion 23 does not pivot about any predefined axis or providing the movable portion 23 with smart materials and changing the shape of the movable portion 23 by heating or electrifying the smart materials.

With reference back to FIGS. 1, 2 and 3, it is seen that the variable area engine inlet 15 may be provided as a first (or starboard side) variable area engine inlet 151 and a second (or port side) variable area engine inlet 152. In such cases, both the first and second variable area engine inlets 151 and 152 provide air flow to the engine 17 and may be controlled as described above by the controller 18. In particular, the controller 18 may be configured to independently vary respective capture areas 150 of the first and second variable area engine inlets 151 and 152 in accordance with the current conditions by driving movements of the movable portion 23 in each of the first and second variable area engine inlets 151 and 152. For example, during a yaw movement of the helicopter 10 where flow asymmetries may result in distortions at the face of the engine 17, the controller 18 may dilate the slower moving interior (relative to the yaw movement) one of the first and second variable area engine inlets 151 and 152 and constrict the faster moving outer (relative to the yaw movement) one of the first and second variable area engine inlets 151 and 152.

Figure 9:
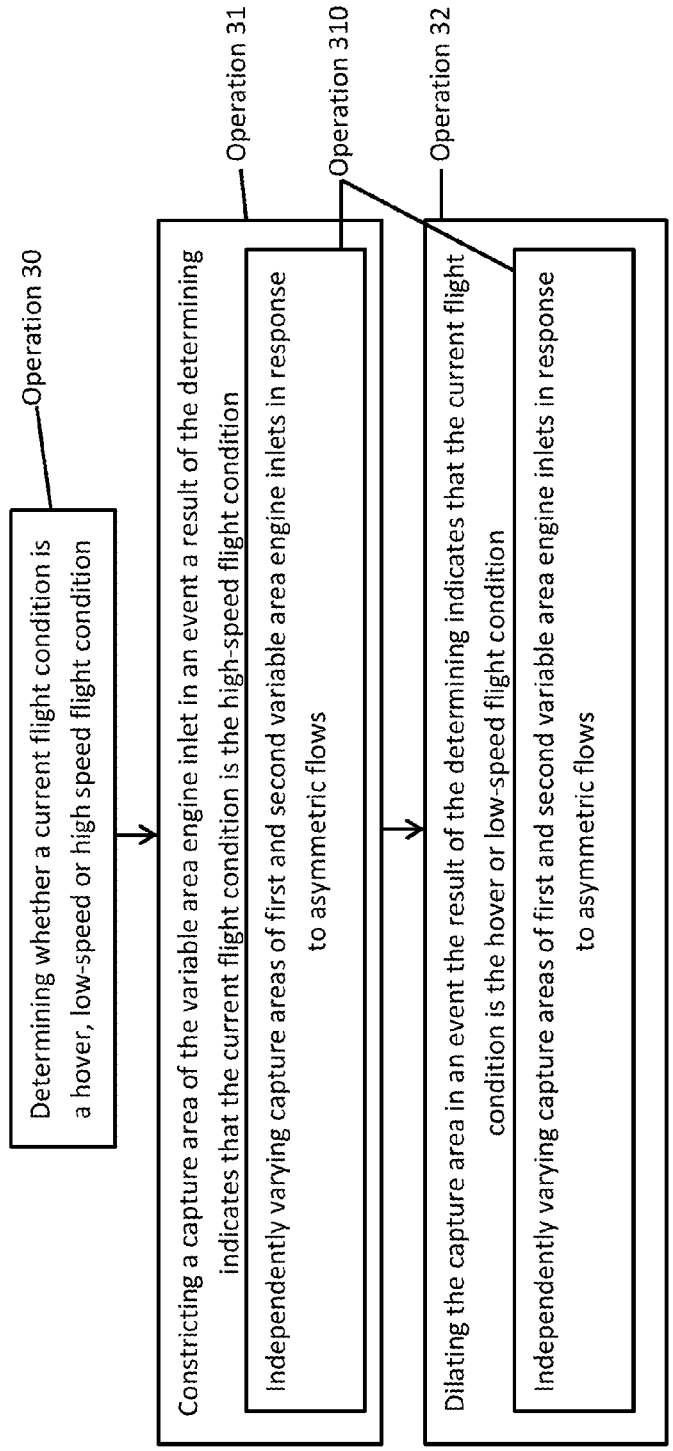
FIG. 9 is a flow diagram illustrating a method of controlling the helicopter inlets of FIGS. 4-7B in accordance with embodiments.

In accordance with further aspects of the invention and, with reference to FIG. 9, a method of controlling a variable area engine inlet of a helicopter is provided. The method includes determining whether a current flight condition is a hover, low-speed or high speed flight condition (operation 30), constricting a capture area of the variable area engine inlet in an event a result of the determining indicates that the current flight condition is the high-speed flight condition (operation 31) and dilating the capture area in an event the result of the determining indicates that the current flight condition is the hover or low-speed flight condition (operation 32). As noted above, the dilating may include moving a horizontally and/or vertically oriented inlet portion of the variable area engine inlet to a first position associated with a non-constricted condition of the capture area and the constricting may include moving the horizontally and/or vertically oriented inlet portion to a second position associated with a constricted condition of the capture area.

As shown in FIG. 9, the method may further include an independent varying of respective capture areas of a multiple-duct engine inlet in accordance with the current conditions and in response to a condition characterized by asymmetric flows relative to the first and second variable area engine inlets 151 and 152 (operation 310).

Figure 10:
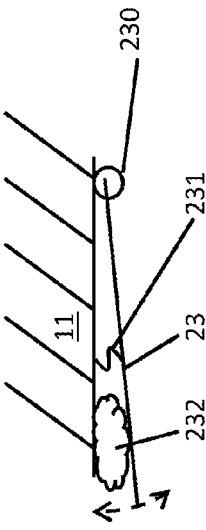
FIG. 10 is a schematic illustration of a passive movable portion of the helicopter inlets of FIGS. 4 and 5A, 5B or FIGS. 7 and 7A,7B in accordance with embodiments.

In accordance with still further aspects of the invention and, with reference to FIG. 10, it will be understood that although the description provided above generally relates to cases in which the movable portion 23 is driven to move by the servo elements 182 of the controller 18, alternative embodiments exist in which movement of the movable portion 23 is not controlled by the controller 18 or any component thereof and is, instead, at least partially passively responsive to current flight conditions. For example, the movable portion 23 may be passively moved from the first position to the second position as a speed of the helicopter 10 increases in response to corresponding increases in air flow pressures and/or speeds within the variable area engine inlet 15. That is, the movement of the movable portion 23 may be driven by the increases in air flow pressures and/or speeds within the variable area engine inlet 15. In such cases, as shown in FIG. 10, the movable portion 23 may be coupled to the airframe 11 by way of the hinge 230 and an elastic element 231. The elastic element 231 is disposed to bias the movable portion 23 towards the first position but is configured to permit the movable portion 23 to move toward the second position in passive response to air pressures 232 increasing beyond a predefined limit.

Figure 11B:
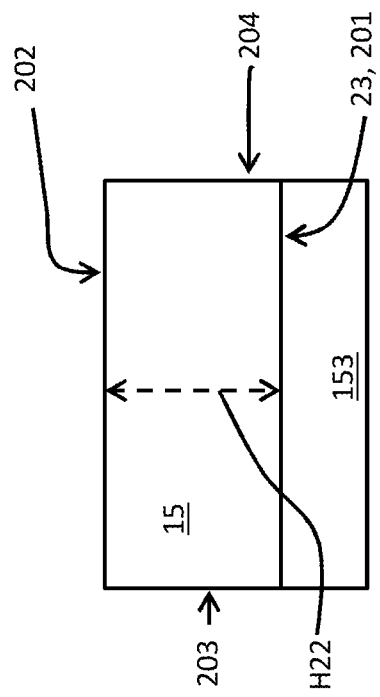
FIG. 11B is a schematic axial view of the helicopter engine inlet in a constricted condition such that an alternative inlet is opened in accordance with further embodiments.
Figure 11A:
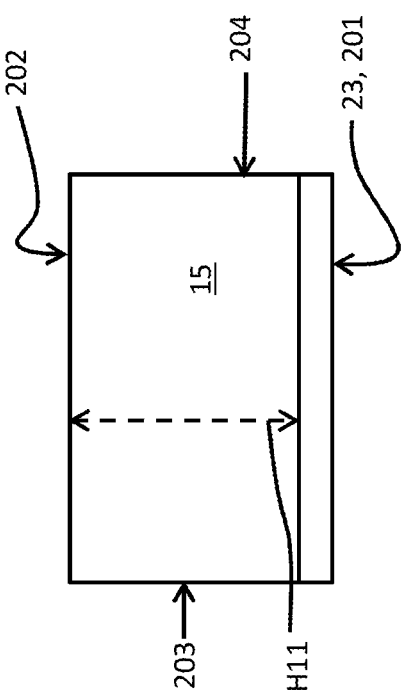
FIG. 11A is a schematic axial view of the helicopter engine inlet in a non-constricted condition in accordance with further embodiments.

In accordance with further embodiments and, as shown in FIGS. 11A and 11B, the movable portion 23 may be provided as a section 201 of fuselage of the airframe 11 or may be a component of the same. In such cases, the non-constricted condition is assumed when the current flight conditions are low-speed or hover flight conditions and the movable portion 23 is accordingly disposed such that a height of the variable area engine inlet 15 is defined as the initial height H11. By contrast, the constricted condition is assumed when the current flight conditions are high-speed flight conditions and the movable portion 23 is accordingly disposed such that the height of the variable area engine inlet 15 is defined as a secondary height H22, which is shorter than the initial height H11 due to the fact that the section 201 of the fuselage has moved upwardly. In such cases, the movement of the section 201 of the fuselage may open an alternate inlet 153. This alternate inlet 153 may provide for airflow to be used in compartment cooling, transmission bay cooling, etc. The alternate inlet 153 may also be used to pull off low energy boundary layer flow and to prevent the boundary layer flow from being ingested by the engine inlet to thereby increase engine performance.

The variable area engine inlet 15 described above presents little to no performance compromise in accommodating hover or low-versus high-speed flight conditions. Indeed, analyses of the above-described structures have shown significant performance increases in hover with negligible performance differences during high-speed flight conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A dual variable area engine inlet of a helicopter, comprising:
   a fuselage section;
   a horizontally oriented top wall section disposed to oppositely face the fuselage section at a distance;
   a main rotor pylon section extending between the fuselage section and the horizontally oriented top wall section;
   vertically oriented side wall sections respectively extending between the fuselage section and opposite ends of the horizontally oriented top wall section and being respectively disposed to face opposite sides of the main rotor pylon section at a distance,
   the fuselage section, a leading side of the horizontally oriented top wall section, the main rotor pylon section and a leading side of the vertically oriented side wall sections defining capture areas with forward-most portions thereof being forward facing openings through which airflow is drawn; and
   movable portions respectively disposed as components of the horizontally oriented top wall section within the capture areas to occupy and move between first and second positions respectively associated with non-constricted and constricted conditions of the capture areas and each being independently movable to reduce or increase respective heights of the capture areas.

2. The dual variable area engine inlet according to claim 1, wherein the movable portions are respectively disposed as components of only the horizontally oriented top wall section and are independently movable to reduce or increase only the respective heights of the capture areas.

3. A dual variable area engine inlet of a helicopter, comprising:
a fuselage section;
a horizontally oriented top wall section disposed to oppositely face the fuselage section at a distance;
a main rotor pylon section extending between the fuselage section and the horizontally oriented top wall section;
vertically oriented side wall sections respectively extending between the fuselage section and opposite ends of the horizontally oriented top wall section and being respectively disposed to face opposite sides of the main rotor pylon section at a distance,
the fuselage section, a leading side of the horizontally oriented top wall section, the main rotor pylon section and a leading side of the vertically oriented side wall sections defining capture areas with forward-most portions thereof being forward facing openings through which airflow is drawn; and
movable portions respectively disposed as components of the vertically oriented side wall sections within the capture areas to occupy and move between first and second positions respectively associated with non-constricted and constricted conditions of the capture areas and each being independently movable to reduce or increase respective widths of the capture areas.

4. The dual variable area engine inlet according to claim 3, wherein the movable portions are respectively disposed as components of only the vertically oriented side wall sections and are independently movable to reduce or increase only the respective widths of the capture areas.

* * * * *